(12) United States Patent
Uchiyama et al.

(10) Patent No.: US 8,315,471 B2
(45) Date of Patent: Nov. 20, 2012

(54) IMAGE PROCESSOR

(75) Inventors: Atsushi Uchiyama, Osaka (JP); Yujiro Tani, Osaka (JP); Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 899 days.

(21) Appl. No.: 12/403,041

(22) Filed: Mar. 12, 2009

(65) Prior Publication Data

US 2009/0238447 A1 Sep. 24, 2009

(30) Foreign Application Priority Data

Mar. 24, 2008 (JP) ................................ 2008-075966

(51) Int. Cl.
*G06K 9/00* (2006.01)
(52) U.S. Cl. ..................... 382/251; 382/232; 348/14.13; 348/27
(58) Field of Classification Search .................. 382/232, 382/251; 348/14.13, 27
See application file for complete search history.

(56) References Cited

U.S. PATENT DOCUMENTS

| | | | | |
|---|---|---|---|---|
| 5,079,621 | A * | 1/1992 | Daly et al. | 348/396.1 |
| 5,473,377 | A * | 12/1995 | Kim | 375/240.03 |
| 6,792,152 | B1 * | 9/2004 | Shibata et al. | 382/239 |
| 6,904,178 | B2 * | 6/2005 | Boliek et al. | 382/251 |
| 6,952,495 | B1 * | 10/2005 | Lee et al. | 382/168 |
| 7,269,219 | B1 * | 9/2007 | Haskell et al. | 375/240.04 |
| 7,684,632 | B2 * | 3/2010 | Samadani | 382/251 |
| 7,720,300 | B1 * | 5/2010 | Malladi et al. | 382/251 |
| 8,019,150 | B2 * | 9/2011 | Bezryadin | 382/162 |
| 8,130,828 | B2 * | 3/2012 | Hsu et al. | 375/240.03 |
| 2005/0276501 | A1 * | 12/2005 | Nakayama et al. | 382/251 |
| 2006/0072836 | A1 * | 4/2006 | Chen et al. | 382/232 |
| 2009/0086816 | A1 * | 4/2009 | Leontaris et al. | 375/240.03 |

FOREIGN PATENT DOCUMENTS

| | | |
|---|---|---|
| JP | 11-205797 | 7/1999 |
| JP | 2003-348586 | 12/2003 |
| JP | 2005-333251 | 12/2005 |
| JP | 2008-17247 | 1/2008 |

OTHER PUBLICATIONS

On optimal Quantization of noisy sources., Ayanoglu Ender, IEEE, 0018-9448, 1990, pp. 1450-1452.*
U.S. Appl. No. 12/400,997, filed Mar. 10, 2009, Tani, et al.
U.S. Appl. No. 12/401,132, filed Mar. 10, 2009, Tani, et al.
U.S. Appl. No. 12/402,817, filed Mar. 12, 2009, Uchiyama, et al.
"HD Photo-Photographic Still Image File Format", Nov. 7, 2006, 140 pages.
"Coding of Still Pictures—JBIG JPEG", ISO/IEC JTC 1/SC 29/WG1 N 4392, ISO/IEC CD 29199-2, Dec. 19, 2007, 151 pages.
Office Action issued Jan. 17, 2012 in Japan Application No. 2008-075966 (With English Translation).

* cited by examiner

*Primary Examiner* — Jayesh A Patel
(74) *Attorney, Agent, or Firm* — Oblon, Spivak, McClelland, Maier & Neustadt, L.L.P.

(57) ABSTRACT

An image processor includes a frequency transform unit performing frequency transform independently on a luminance signal and plural chrominance signals and outputting an item of frequency data of the luminance signal and plural items of frequency data of the chrominance signals, and a quantization unit performing quantization independently on plural items of frequency data inputted from the frequency transform unit. The quantization unit performs quantization on one or plural specific items of frequency data corresponding to a signal with noise among the frequency data of the luminance signal and the chrominance signals, employing a quantization coefficient having a value greater than "1", and performs quantization on frequency data apart from the specific items of frequency data, employing a quantization coefficient having a value "1".

9 Claims, 16 Drawing Sheets

FIG. 2A
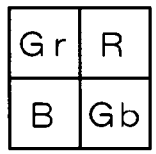
FIG. 2B
$K = Gr - Gb$
$G' = Gb + \text{floor}(K/2)$
$V = B - R$
$U = -\{\text{ceiling}(V/2) + R - G'\}$
$Y = G' + \text{floor}(-U/2) - \alpha$
FIG. 3
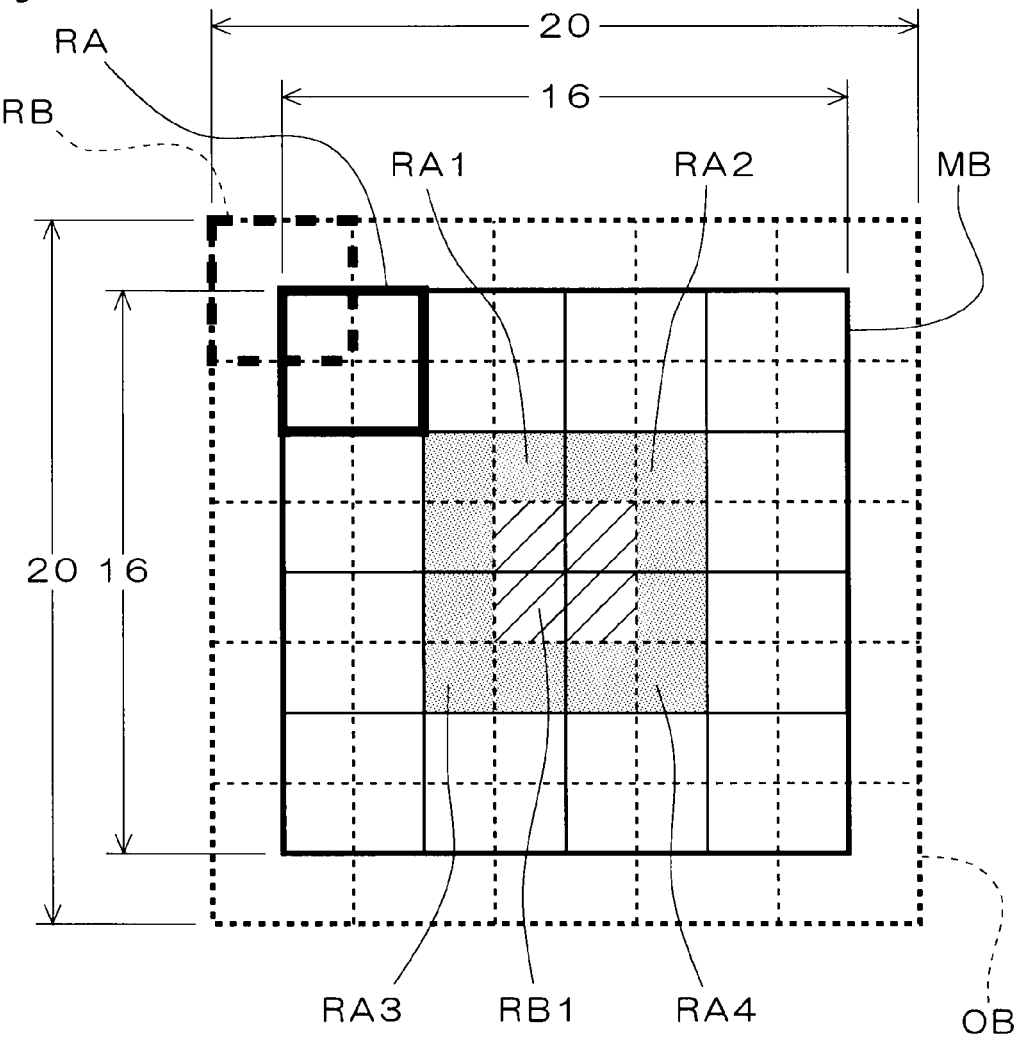

FIG. 5A

| S4Y | 0 | 0 | 0 | 0 | 1 | 0 | 1 | 0 |

FIG. 5B

| S4U | 0 | 1 | 0 | 1 | 0 | 1 | 1 | 0 |

FIG. 5C

| S4V | 0 | 0 | 1 | 1 | 1 | 0 | 1 | 0 |

FIG. 5D

| S4K | 0 | 0 | 0 | 1 | 0 | 1 | 1 | 0 |

P1 brackets the last three bits.

P1 brackets the last three bits.

| S9Y | 0 | 0 | 0 | 0 | 1 | 0 | 1 | 0 |

FIG. 8B

| S9U | 0 | 0 | 0 | 0 | 1 | 0 | 1 | 0 |

FIG. 8C

| S9V | 0 | 0 | 0 | 0 | 0 | 1 | 1 | 1 |

FIG. 8D

| S9K | 0 | 0 | 0 | 1 | 0 | 1 | 1 | 0 |

FIG. 9A  QY=1
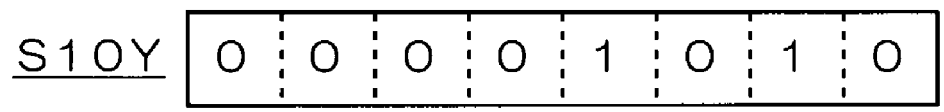
FIG. 9B  QU=8
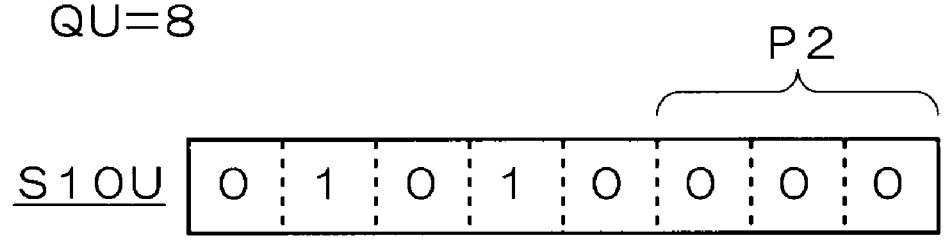
FIG. 9C  QV=8
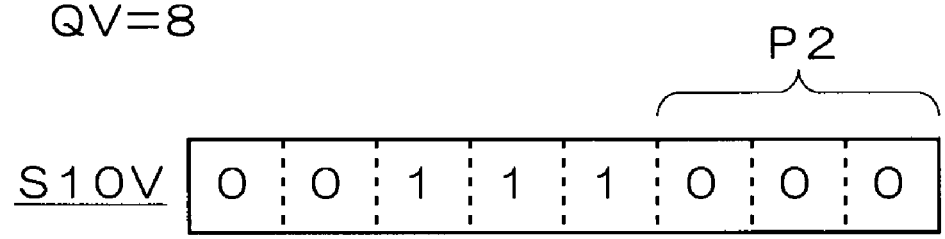
FIG. 9D  QK=1
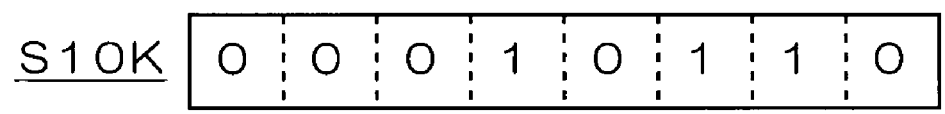

FIG. 10A    QY=8
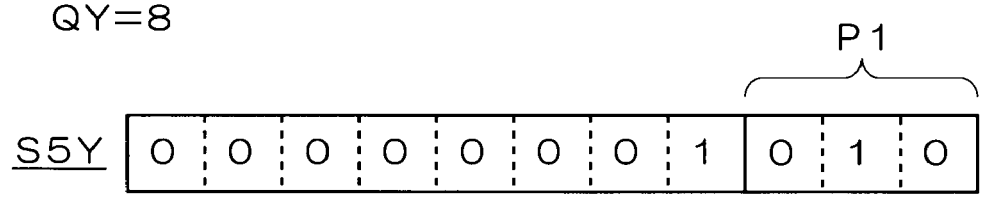
FIG. 10B    QU=1
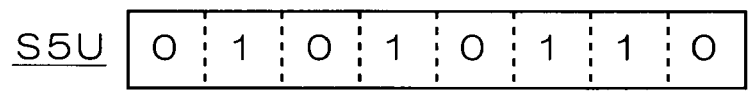
FIG. 10C    QV=1
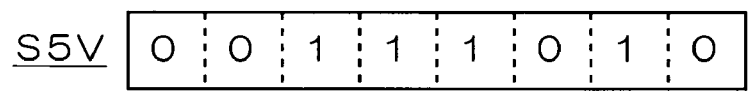
FIG. 10D    QK=1
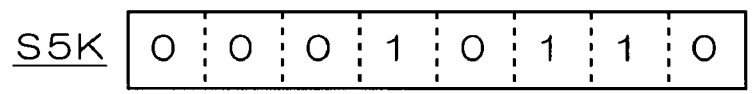

FIG. 11A  QY=1

| S5Y | 0 | 0 | 0 | 0 | 1 | 0 | 1 | 0 |

FIG. 11B  QU=1

| S5U | 0 | 1 | 0 | 1 | 0 | 1 | 1 | 0 |

FIG. 11C  QV=1

| S5V | 0 | 0 | 1 | 1 | 1 | 0 | 1 | 0 |

FIG. 11D  QK=8

| S5K | 0 | 0 | 0 | 0 | 0 | 0 | 1 | 0 | 1 | 1 | 0 |

IMAGE PROCESSOR

CROSS-REFERENCE TO RELATED APPLICATIONS

This application claims priority to Japanese Patent Application No. 2008-075966. The entire disclosure of Japanese Patent Application No. 2008-075966 is hereby incorporated herein by reference.

BACKGROUND OF THE INVENTION

1. Field of the Invention

The present invention generally relates to an image processor, and more particularly, to an encoder and a decoder for HD Photo.

2. Description of the Background Art

An imaging device aiming at inhibition of color noise is disclosed in Japanese Patent Application Publication No. 2005-333251 (hereinafter referred to as patent literature 1). A photoreceiver of such an imaging device is provided with a three-color filter of Bayer array. Furthermore, such an imaging device has a detection unit and a correction unit which are realized as a function of a CPU. The detection unit compares a pixel value of a Gb pixel with an average pixel value of four Gr pixels positioned diagonally opposite to the Gb pixel, targeting raw image data stored in a buffer memory. When the average pixel value of the Gr pixels is greater than the pixel value of the Gb pixel, the correction unit replaces the pixel value of the Gb pixel with the average pixel value of the Gr pixels, thereby correcting color noise.

Microsoft Corporation recently proposes HD Photo as a still image file format that offers higher image quality than JPEG while requiring more simple circuit configuration and computation than JPEG 2000.

An encoder for HD Photo includes a frequency transform unit performing predetermined frequency transform (PCT), and a pre-filter performing predetermined prefiltering so as to reduce block artifacts. The frequency transform unit performs frequency transform with a pixel block having 4 pixels in column×4 pixels in row as a unit region for processing. The pre-filter performs prefiltering with a region which overlaps with plural unit regions for processing by the frequency transform unit as a unit region for processing, before frequency transform is performed. One can chose at will whether or not prefiltering is performed by the setting of an overlap coefficient.

A decoder for HD Photo includes a frequency inverse transform unit performing frequency inverse transform that corresponds to the above frequency transform, and a post-filter performing postfiltering that corresponds to the above prefiltering. The frequency inverse transform unit performs frequency inverse transform with a pixel block having 4 pixels in column×4 pixels in row as a unit region for processing. The post-filter performs postfiltering with a region which overlaps with plural unit regions for processing by the frequency inverse transform unit as a unit region for processing, after frequency inverse transform is performed. Similar to the above, one can chose at will whether or not postfiltering is performed by the setting of an overlap coefficient.

The details of HD Photo are disclosed in, for example, "HD Photo—Photographic Still Image File Format", 7 Nov. 2006, Microsoft Corporation. The details of JPEG XR related to HD Photo are disclosed in, for example, "Coding of Still Pictures—JBIG JPEG", 19 Dec. 2007, ISO/IEC JTC 1/SC 29/WG1 N 4392.

In an imaging device disclosed in the above patent literature 1, the detection and correction units perform detection and correction of color noise, based on the pixel values of Gr and Gb pixels. However, luminance and chrominance signals coexist in the pixel values of the Gr and Gb pixels. Thus it is difficult to accurately remove only color noise without affecting luminance. Furthermore, the imaging device disclosed in the above patent literature 1 requires dedicated detection and correction units to be additionally implemented merely to inhibit color noise, which causes increase in cost.

SUMMARY OF THE INVENTION

It is an object of the present invention to provide an image processor that inhibits noise sufficiently with no need for an additional device dedicated to inhibition of noise.

According to an aspect of the present invention, an image processor includes a frequency transform unit performing frequency transform independently on a luminance signal and plural chrominance signals and outputting an item of frequency data of the luminance signal and plural items of frequency data of the chrominance signals, and a quantization unit performing quantization independently on plural items of frequency data inputted from the frequency transform unit. The quantization unit performs quantization on one or plural specific items of frequency data corresponding to a signal with noise among the frequency data of the luminance signal and the chrominance signals, employing a quantization coefficient having a value greater than "1", and performs quantization on frequency data apart from the specific items of frequency data, employing a quantization coefficient having a value "1".

In the image processor, the quantization unit performs quantization on one or plural specific items of frequency data corresponding to a signal with noise among the frequency data of the luminance signal and the chrominance signals, employing a quantization coefficient having a value greater than "1". Thus with respect to the above specific items of the frequency data, the data in the lower bit positions is discarded by quantization, and thereby a little variation of the frequency data disappears. Consequently, noise equivalent to the little variation of the frequency data is inhibited.

In contrast, quantization is performed on frequency data apart from the specific items of frequency data, employing a quantization coefficient having a value "1". Thus with respect to the frequency data corresponding to a signal with no noise, the data in the lower bit positions is not discarded by quantization. Consequently, with respect to the signal with noise, the noise is effectively inhibited, without affecting the signal with no noise.

In addition, increase in cost is avoided, since no device dedicated merely to inhibition of noise is required to be additionally implemented.

Moreover, quantization is performed on the above specific items of frequency data, employing a quantization coefficient having a value greater than "1". Thus effective bit width of quantized data outputted from the quantization unit is reduced. Consequently, an amount of code of coded data outputted from a subsequent encoding unit is reduced. That is, further compression of data amount of image data is achieved.

Preferably, in the image processor, the quantization unit allows a value of a quantization coefficient to be set variably for the specific items of frequency data, in accordance with an extent of noise.

The image processor is capable of sufficiently inhibiting noise, by setting a quantization coefficient at a great value for frequency data corresponding to a signal with high noise.

Preferably, in the image processor, the specific items of frequency data includes highpass, lowpass, and direct current components, and the quantization unit allows values of quantization coefficients to be set variably for each component, in accordance with an extent of noise.

The image processor is capable of sufficiently inhibiting noise, by setting a quantization coefficient at a great value for a component with high noise.

Preferably, the image processor further includes a pre-filter optionally performing prefiltering with a region which overlaps with plural unit regions for processing by the frequency transform unit as a unit region for processing, before frequency transform is performed, a color conversion unit being arranged in a stage preceding the pre-filter and converting a pixel signal of a first color space inputted from outside into a pixel signal of a second color space including the luminance signal and the plural chrominance signals, a frequency inverse transform unit performing frequency inverse transform, a post-filter optionally performing postfiltering with a region which overlaps with plural unit regions for processing by the frequency inverse transform unit as a unit region for processing, after frequency inverse transform is performed, and a color inverse conversion unit being arranged in a stage subsequent to the post-filter and inversely converting a pixel signal of the second color space into a pixel signal of the first color space. The pre-filter performs prefiltering on one or plural specific signals corresponding to a signal with noise among the luminance signal and the chrominance signals inputted from the color conversion unit, and the post-filter does not perform postfiltering on the specific signals.

In the image processor, the pre-filter performs prefiltering on one or plural specific signals corresponding to a signal with noise among the luminance signal and the chrominance signals, and the post-filter does not perform postfiltering on the specific signals. Thus noise is inhibited by performing prefiltering and not performing postfiltering. Furthermore, since no device dedicated merely to inhibition of noise is required to be additionally implemented, increase in cost is avoided.

Preferably, in the image processor, the number of times that prefiltering is performed on the specific signals is set at once or plural times.

The image processor is capable of sufficiently inhibiting noise, by setting the number of times that prefiltering is performed at once or plural times, in accordance with an extent of noise.

The image processor inhibits noise sufficiently with no need for an additional device dedicated to inhibition of noise.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 2A and 2B illustrate color conversion by a color conversion unit.

FIG. 3 is a diagram showing a macroblock MB within a pixel plane.

FIGS. 5A to 5D show frequency data before quantization.
FIGS. 6A to 6D show frequency data after quantization.

FIGS. 8A to 8D show frequency data before dequantization.

FIGS. 9A to 9D show frequency data after dequantization.
FIGS. 10A to 10D show frequency data after quantization.
FIGS. 11A to 11D show frequency data after quantization.
FIGS. 12A to 12D show frequency data after quantization.

DESCRIPTION OF THE PREFERRED EMBODIMENTS

Figure 1:
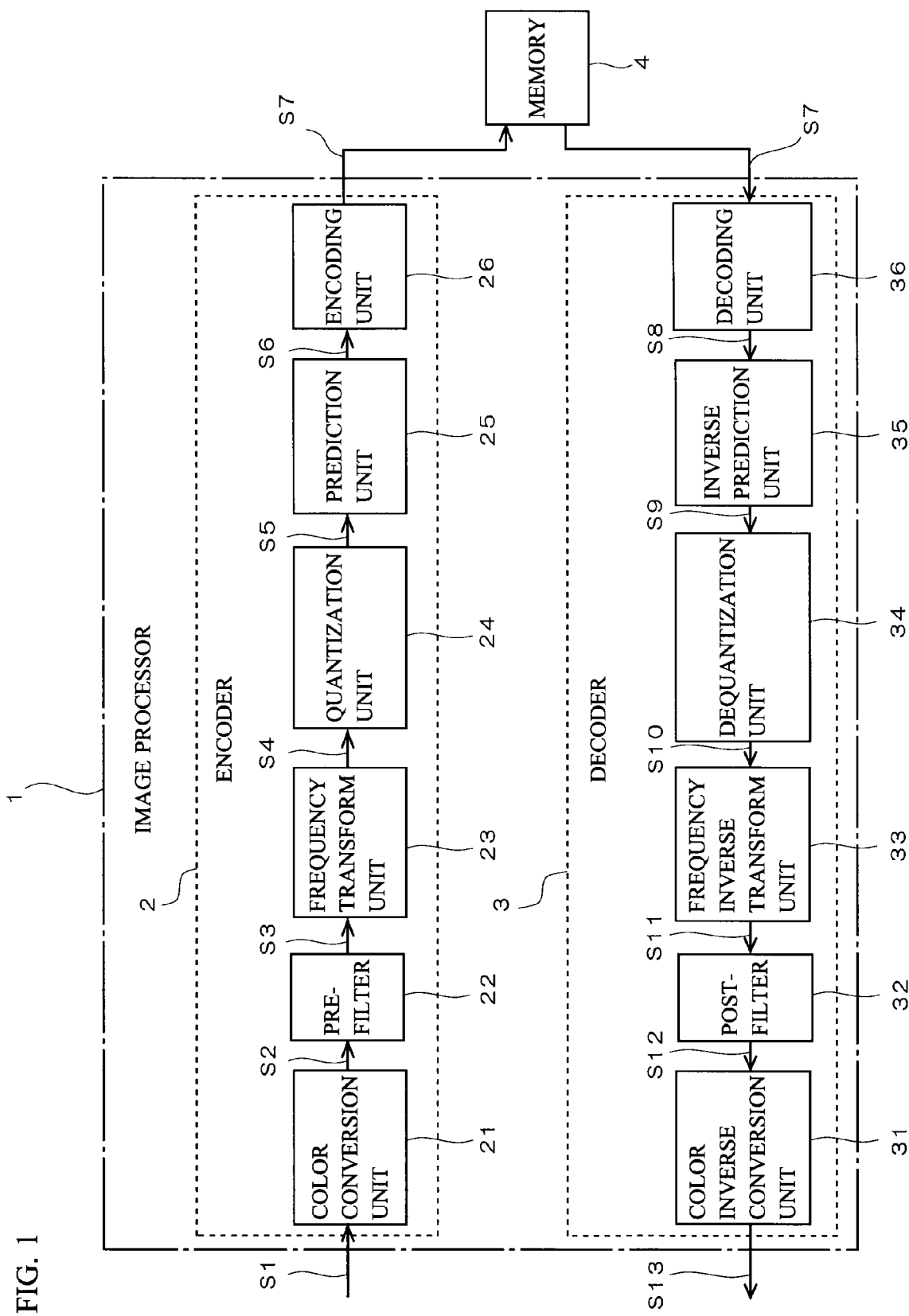
FIG. 1 is a block diagram showing a configuration of an image processor according to a preferred embodiment of the present invention.

Preferred embodiments of the present invention are described in detail below referring to the drawings. It should be noted that identical reference numerals throughout the drawings indicate identical or equivalent elements.

An example of applying an image processor according to the present invention to an encoder and a decoder for HD Photo is described in the following embodiment.

FIG. 1 is a block diagram showing a configuration of an image processor 1 according to a preferred embodiment of the present invention. The image processor 1 includes an encoder 2 and a decoder 3. The encoder 2 includes a color conversion unit 21, a pre-filter 22, a frequency transform unit 23, a quantization unit 24, a prediction unit 25, and an encoding unit 26. The decoder 3 includes a color inverse conversion unit 31, a post-filter 32, a frequency inverse transform unit 33, a dequantization unit 34, an inverse prediction unit 35, and a decoding unit 36.

Operation of the encoder 2 is first illustrated.

A pixel signal S1 of RGB color space is inputted from an imaging element, such as a CCD or CMOS image sensor, that is provided with a three-color filter of Bayer array, to the color conversion unit 21. The color conversion unit 21 converts the pixel signal S1 of RGB color space into a pixel signal S2 of YUVK color space, and outputs the same. That is, the pixel signal S2 includes a luminance signal (Y signal), and plural chrominance signals (U, V, and K signals). The K signal is a difference value between the pixel values of Gr and Gb pixels, and is regarded as a type of chrominance signal in the present Specification.

FIGS. 2A and 2B illustrate color conversion by the color conversion unit 21. Gr, R, B, and Gb pixels are arranged in the order shown in FIG. 2A. The color conversion unit 21 calculates each of the pixel values of K, V, U, and Y signals in accordance with the conversion equations in FIG. 2B. In the conversion equations in FIG. 2B, "floor (x)" denotes the largest integer that is lesser than or equal to x, and "ceiling (x)" denotes the smallest integer that is greater than or equal to x. Furthermore, "α" denotes ½ of the number of grayscale levels of a pixel value. For example, when a pixel value is represented by 8 bits, which allow 256-level grayscale, "α" is 128.

Referring to FIG. 1, the pixel signal S2 is inputted from the color conversion unit 21 to the pre-filter 22. The pre-filter 22 optionally performs prefiltering on the pixel signal S2 and outputs a pixel signal S3. In HD Photo, one can chose at will whether or not prefiltering should be performed by the pre-filter 22, by the setting of an overlap coefficient.

The pixel signal S3 is inputted from the pre-filter 22 to the frequency transform unit 23. The frequency transform unit 23 performs predetermined frequency transform (PCT: HD Photo Core Transform) on the pixel signal S3, and outputs frequency data S4 after frequency transform. In HD Photo, the frequency data S4 includes highpass, lowpass, and direct current components.

FIG. 3 is a diagram showing a macroblock MB within a pixel plane. The macroblock MB consists of a total of 256 pixels of 16 pixels in column×16 pixels in row. A total of 16 pixel blocks RA of 4 in column×4 in row are defined within the macroblock MB. Each pixel block RA consists of a total of 16 pixels of 4 pixels in column×4 pixels in row. The frequency transform unit 23 performs frequency transform with each pixel block RA as a unit region for processing.

Furthermore, a pixel block OB having 20 pixels in column×20 pixels in row, being 2 pixels each larger to the left, right, top and bottom than the macroblock MB, is defined. A total of 25 pixel blocks RB of 5 in column×5 in row are defined within the pixel block OB. Each pixel block RB consists of a total of 16 pixels of 4 pixels in column×4 pixels in row. The pre-filter 22 performs predetermined prefiltering with each pixel block RB as a unit region for processing. However, at an edge of a pixel plane, a unit region for processing having 4 pixels in column×4 pixels in row is not secured, but the pre-filter 22 performs prefiltering with a pixel block having 4 pixels in column×2 pixels in row, 2 pixels in column×4 pixels in row, or 2 pixels in column×2 pixels in row as a unit region for processing.

As shown in FIG. 3, a pixel block RB1 (indicated by oblique lines), which is a unit region for processing of the pre-filter 22, overlaps with 4 pixel blocks RA1 to RA4 (indicated by a sanded pattern), which are unit regions for processing of the frequency transform unit 23. Thus the pre-filter 22 performs prefiltering with a region which overlaps with plural unit regions for processing by the frequency transform unit 23 as a unit region for processing. Consequently, block artifacts are reduced.

Referring to FIG. 1, the frequency data S4 is inputted from the frequency transform unit 23 to the quantization unit 24. The quantization unit 24 quantizes the frequency data S4 and outputs frequency data S5 after quantization.

Figure 4:
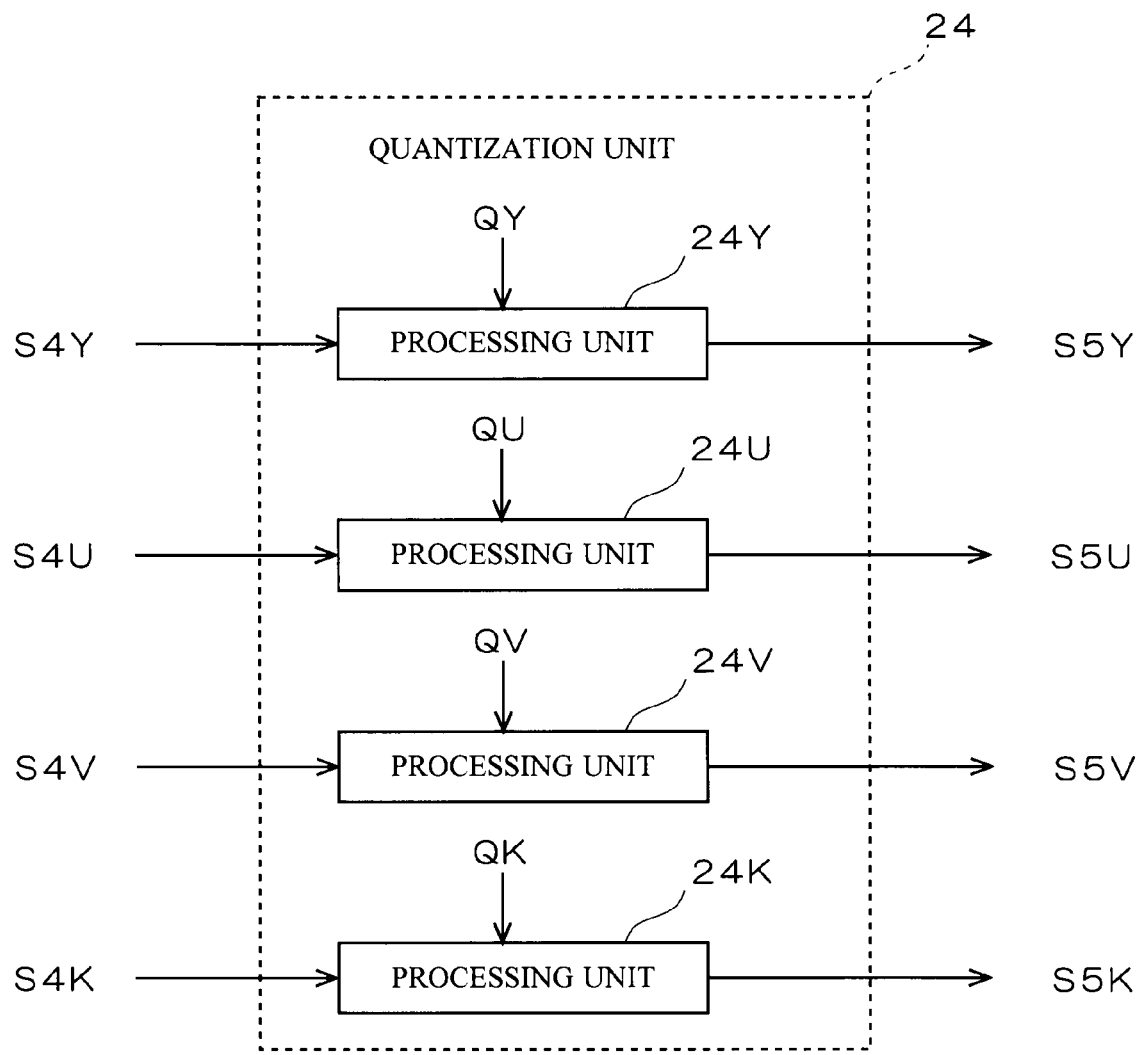
FIG. 4 is a block diagram showing a configuration of a quantization unit.

FIG. 4 is a block diagram showing a configuration of the quantization unit 24. The quantization unit 24 includes processing units 24Y, 24U, 24V, and 24K. Frequency data S4Y of a Y signal is inputted from the frequency transform unit 23 to the processing unit 24Y. Similarly, frequency data S4U, S4V, and S4K of U, V, and K signals are respectively inputted from the frequency transform unit 23 to the processing units 24U, 24V, and 24K. The frequency data S4Y, S4U, S4V, and S4K are equivalent to the frequency data S4 shown in FIG. 1.

The processing unit 24Y divides the frequency data S4Y by a quantization coefficient QY so as to output frequency data S5Y after quantization. Similarly, the processing units 24U, 24V, and 24K divide the frequency data S4U, S4V, and S4K by quantization coefficients QU, QY, and QK so as to output frequency data S5U, S5V, and S5K after quantization, respectively.

FIGS. 5A to 5D show the frequency data S4Y, S4U, S4V, and S4K. FIGS. 5A to 5D show, by way of example, the frequency data S4Y, S4U, S4V, and S4K having a bit width of 8 bits. In the example shown in FIG. 5A, the frequency data S4Y has a value "00001010". In the example shown in FIG. 5B, the frequency data S4U has a value "01010110". In the example shown in FIG. 5C, the frequency data S4V has a value "00111010". In the example shown in FIG. 5D, the frequency data S4K has a value "00010110".

FIGS. 6A to 6D show the frequency data S5Y, S5U, S5V, and S5K. Here, it is assumed that noise occurs with respect to U and V signals, and no noise occurs with respect to Y and K signals, due to an attribute of an imaging element.

In such a case, as shown in FIGS. 6A to 6D, the values of the quantization coefficients QU and QV are set at a value greater than "1" ("8" in the example shown in FIGS. 6B and 6C, and the values of the quantization coefficients QY and QK are set at "1".

Since the values of the quantization coefficients QY and QK are set at "1", as shown in FIGS. 6A and 6D, the frequency data S5Y and S5K are equal to the frequency data S4Y and S4K shown in FIGS. 5A and 5D, respectively.

The processing unit 24U divides the frequency data S4U by the value "8" of the quantization coefficient QU. Specifically, as shown in FIG. 6B, the processing unit 24U shifts the frequency data S4U shown in FIG. 5B by 3 bit positions to the right, and then inserts "0" into all bits in the upper (i.e. more significant) 3 bit positions, while discarding the fractional part P1, so as to output the frequency data S5U having a value "00001010. Since "0" is inserted into all of the upper 3 bits, the effective bit width of the frequency data S5U is 5 bits.

Similarly, the processing unit 24V divides the frequency data S4V by the value "8" of the quantization coefficient QV. Specifically, as shown in FIG. 6C, the processing unit 24V shifts the frequency data S4V shown in FIG. 5C by 3 bit positions to the right, and then inserts "0" into all of the upper 3 bits, while discarding the fractional part P1, so as to output the frequency data S5V having a value "00000111. Since "0" is inserted into all of the upper 3 bits, the effective bit width of the frequency data S5V is 5 bits.

Referring to FIG. 1, frequency data S5 is inputted from the quantization unit 24 to the prediction unit 25. The frequency data S5 is equivalent to the frequency data S5Y, S5U, S5V, and S5K shown in FIG. 4. The prediction unit 25 obtains a difference value between a value of the frequency data S5 inputted from the quantization unit 24 and a value of specific, previously-processed frequency data (prediction value), and outputs as frequency difference data S6.

The frequency difference data S6 is inputted from the prediction unit 25 to the encoding unit 26. The encoding unit 26 performs entropy coding on the frequency difference data S6 and outputs coded data S7. The coded data S7 outputted from the encoding unit 26 is stored in a memory 4. To be exact, according to HD Photo, entropy coding is performed only on Normal Bits equivalent to upper bits in the frequency difference data S6, and Flex Bits equivalent to lower bits are stored in the memory 4 without entropy coding being performed.

Next operation of the decoder 3 is illustrated.

The coded data S7 is inputted from the memory 4 to the decoding unit 36. The decoding unit 36 performs entropy decoding on the coded data S7 and outputs frequency difference data S8 equivalent to the above frequency difference data S6.

The frequency difference data S8 is inputted from the decoding unit 36 to the inverse prediction unit 35. The inverse prediction unit 35 adds the prediction value to the frequency difference data S8 so as to output frequency data S9 equivalent to the above frequency data S5.

The frequency data S9 is inputted from the inverse prediction unit 35 to the dequantization unit 34. The dequantization unit 34 dequantizes the frequency data S9, so as to output frequency data S10 equivalent to the above frequency data S4.

Figure 7:
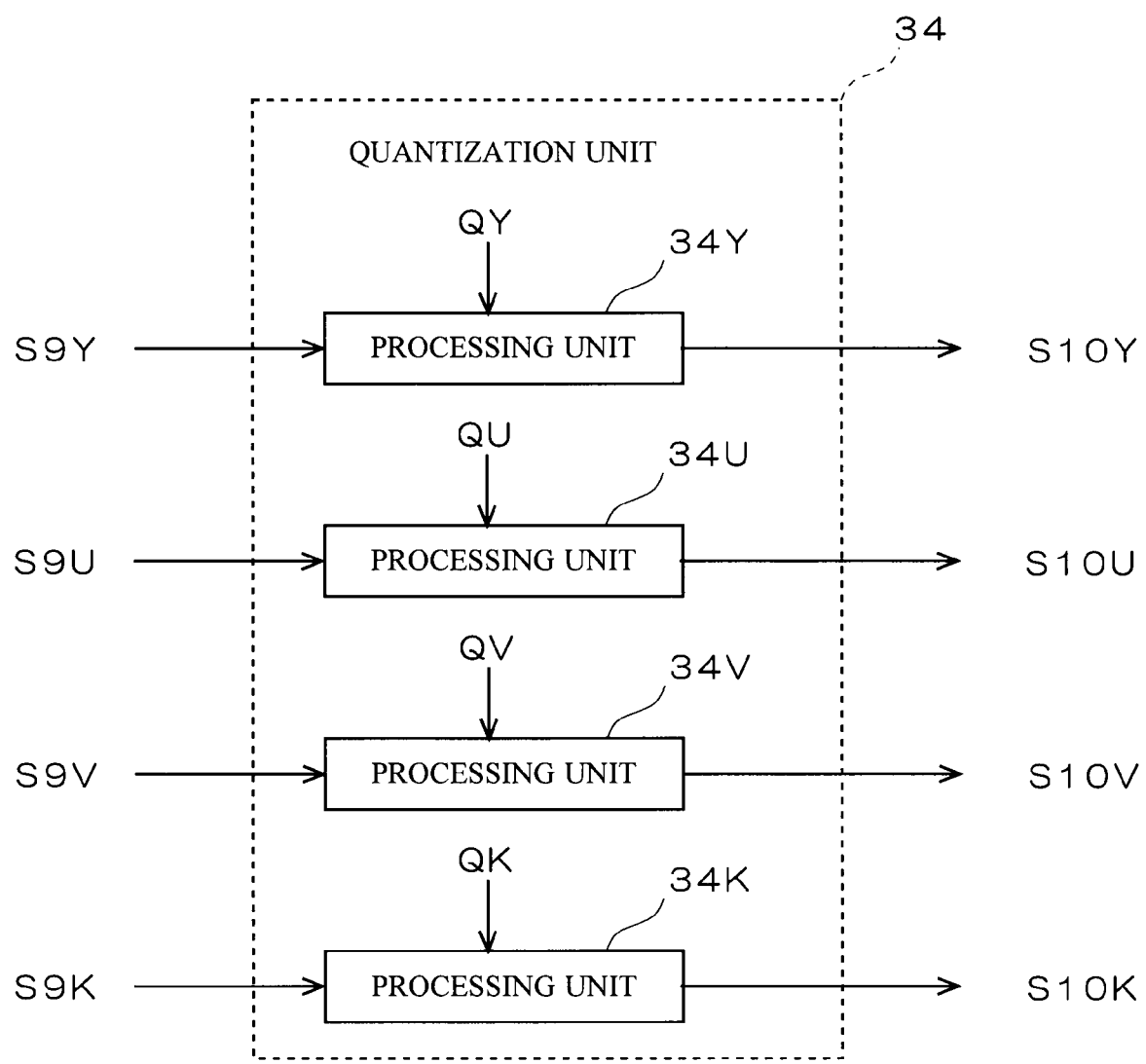
FIG. 7 is a block diagram showing a configuration of a dequantization unit.

FIG. 7 is a block diagram showing a configuration of the dequantization unit 34. The dequantization unit 34 includes processing units 34Y, 34U, 34V, and 34K. Frequency data S9Y of the Y signal is inputted from the inverse prediction unit 35 to the processing unit 34Y. Similarly, frequency data S9U, S9V, and S9K of the U, V, and K signals are respectively inputted from the inverse prediction unit 35 to the processing units 34U, 34V, and 34K. The frequency data S9Y, S9U, S9V, and S9K are equivalent to the frequency data S9 shown in FIG. 1.

The processing unit 34Y multiplies the frequency data S9Y by a dequantization coefficient QY so as to output frequency data S10Y after dequantization. Similarly, the processing units 34U, 34V, and 34K multiply the frequency data S9U, S9V, and S9K by dequantization coefficients QU, QV, and QK so as to output frequency data S10U, S10V, and S10K after dequantization, respectively.

FIGS. 8A to 8D show the frequency data S9Y, S9U, S9V, and S9K. The frequency data S9Y shown in FIG. 8A is equal to the frequency data S5Y shown in FIG. 6A. Similarly, the frequency data S9U, S9V, and S9K shown in FIGS. 8B to 8D are respectively equal to the frequency data S5U, S5V, and S5K shown in FIGS. 6B to 6D.

FIGS. 9A to 9D show the frequency data S10Y, S10U, S10V, and S10K. The dequantization coefficients employed in the dequantization unit 34 are set at the same values as those of the quantization coefficients QY, QU, QV, and QK employed in the quantization unit 24. In this example, the values of the dequantization coefficients QU and QV are set at "8", and the values of the dequantization coefficients QY and QK are set at "1".

Since the values of the dequantization coefficients QY and QK are set at "1", as shown in FIGS. 9A and 9D, the frequency data S10Y and S10K are equal to the frequency data S9Y and S9K shown in FIGS. 8A and 8D, respectively. Furthermore, the frequency data S10Y and S10K are equal to the frequency data S4Y and S4K shown in FIGS. 5A and 5D, respectively.

The processing unit 34U shown in FIG. 7 multiplies the frequency data S9U by the value "8" of the dequantization coefficient QU. Specifically, as shown in FIG. 9B, the processing unit 34U shifts the frequency data S9U shown in FIG. 8B by 3 bit positions to the left, and then inserts "0" into all bits in the lower (i.e. less significant) 3 bit positions P2, while discarding the upper 3 bits which have been overflown, so as to output the frequency data S10U having a value "01010000".

Similarly, the processing unit 34V multiplies the frequency data S9V by the value "8" of the dequantization coefficient QV. Specifically, as shown in FIG. 9C, the processing unit 34V shifts the frequency data S9V shown in FIG. 8C by 3 bit positions to the left, and then inserts "0" into all bits in the lower 3 bit positions P2, while discarding the upper 3 bits which have been overflown, so as to output the frequency data S10V having a value "00111000".

As clearly seen from comparison between FIGS. 9B and 5B, the frequency data S10U is equivalent to the frequency data S4U with the data "110" of the lower 3 bits being replaced by the data "000". Similarly, as clearly seen from comparison between FIGS. 9C and 5C, the frequency data S10V is equivalent to the frequency data S4V with the data "010" of the lower 3 bits being replaced by the data "000".

Referring to FIG. 1, the frequency data S10 is inputted from the dequantization unit 34 to the frequency inverse transform unit 33. The frequency data S10 is equivalent to the frequency data S10Y, S10U, S10V, and S10K shown in FIG. 7. The frequency inverse transform unit 33 performs frequency inverse transform corresponding to the above frequency transform on the frequency data S10, and outputs a pixel signal S11 equivalent to the above pixel signal S3.

The pixel signal S11 is inputted from the frequency inverse transform unit 33 to the post-filter 32. The post-filter 32 optionally performs postfiltering corresponding to the above prefiltering on the pixel signal S11, and outputs a pixel signal S12 equivalent to the above pixel signal S2.

Referring to FIG. 3, the frequency inverse transform unit 33 performs frequency inverse transform with each pixel block RA as a unit region for processing. Furthermore, the post-filter 32 performs postfiltering with each pixel block RB as a unit region for processing. However, at an edge of a pixel plane, a unit region for processing having 4 pixels in column×4 pixels in row is not secured, but the post-filter 32 perform postfiltering with a pixel block having 4 pixels in column×2 pixels in row, 2 pixels in column×4 pixels in row, or 2 pixels in column×2 pixels in row as a unit region for processing. As shown in FIG. 3, a pixel block RB1, which is a unit region for processing of the post-filter 32, overlaps with 4 pixel blocks RA1 to RA4, which are unit regions for processing of the frequency inverse transform unit 33.

Referring to FIG. 1, the pixel signal S12 is inputted from the post-filter 32 to the color inverse conversion unit 31. The color inverse conversion unit 31 converts the pixel signal S12 of YUVK color space into a pixel signal S13 of RGB color space, and outputs to an external device such as a display.

As described above, in the image processor 1 according to the present embodiment, the quantization unit 24 performs quantization on the frequency data S4U and S4V corresponding to the U and V signals with noise among the frequency data S4Y, S4U, S4V, and S4K inputted from the frequency transform unit 23, employing the quantization coefficients QU and QV having a value greater than "1" ("8" in the above example). Thus with respect to the frequency data S4U and S4V, the data of the lower bits (the data of the lower 3 bits in the above example) is discarded by quantization, and thereby a little variation of the frequency data S4U and S4V disappears. Consequently, noise equivalent to the little variation of the frequency data S4U and S4V (noise equivalent to the data of the lower 3 bits in the above example) is inhibited.

In contrast, in the image processor 1 according to the present embodiment, the quantization unit 24 performs quantization on the frequency data S4Y and S4K apart from the frequency data S4U and S4V, employing the quantization coefficients QY and QK having a value "1". Thus with respect to the frequency data S4Y and S4K corresponding to the Y and K signals with no noise, the data of the lower bits is not discarded by quantization. Consequently, without affecting the Y and K signals with no noise, noise of the U and V signals is effectively inhibited.

In addition, the image processor according to the present embodiment makes use of setting of a quantization coefficient in the quantization unit 24 which is primarily provided for HD Photo, in order to realize processing to inhibit noise of the U and V signals. Thus increase in cost is avoided, since no device dedicated merely to inhibition of noise is required to be additionally implemented.

Moreover, in the image processor 1 according to the present embodiment, quantization is performed on the frequency data S4U and S4V, employing the quantization coefficients QU and QV having a value greater than "1". Thus effective bit width of the frequency data S5U and S5V after quantization outputted from the quantization unit 24 is reduced. In the above example, bit width of each of the frequency data S4U and S4V is 8 bits, while bit width of each of the frequency data S5U and S5V is 5 bits. This shows that bit width is reduced by 3 bits. Consequently, with respect to U and V signals, an amount of code of the coded data S7 outputted from the encoding unit 26 is reduced. That is, further compression of data amount of image data is achieved.

<First Modification>

In the above preferred embodiment, the value of each of the quantization coefficients QU and QV is set at "8". Thereby, noise equivalent to the data of the lower 3 bits in the above example is inhibited.

As a first modification, the value of the quantization coefficients QU and QV is not limited to "8", but each value of the quantization coefficients QU and QV may be set variably, in accordance with the extent of noise of U and V signals.

When noise of the U signal is low, for example, the value of the quantization coefficient QU is set at "4". Thereby, noise equivalent to the data of the lower 2 bits of the frequency data S4U is inhibited.

Furthermore, when noise of the V signal is high, for example, the value of the quantization coefficient QV is set at "16". Thereby, noise equivalent to the data of the lower 4 bits of the frequency data S4V is inhibited.

<Second Modification>

In the above embodiment, processing to inhibit noise of U and V signals is performed, assuming that noise occurs with respect to U and V signals, and that no noise occurs with respect to Y and K signals.

As a second modification, when noise occurs only with respect to a Y signal due to an attribute of an imaging element, noise of the Y signal is effectively inhibited without affecting the U, V, and K signals, by setting the quantization coefficient QY corresponding to the Y signal at a value greater than "1", and setting the values of the quantization coefficients QU, QV, and QK corresponding to U, V, and K signals all at "1".

FIGS. 10A to 10D show the frequency data S5Y, S5U, S5V, and S5K according to the second modification. The quantization coefficient QY is set at a value greater than "1" ("8" in the example in FIG. 10A), and the values of the quantization coefficients QU, QV, and QK are all set at "1".

Similarly, when noise occurs only with respect to a K signal due to an attribute of an imaging element, noise of the K signal is effectively inhibited without affecting the Y, U, and V signals, by setting the quantization coefficient QK corresponding to the K signal at a value greater than "1", and setting the values of the quantization coefficients QY, QU, and QV corresponding to Y, U, and V signals all at "1".

FIGS. 11A to 11D show the frequency data S5Y, S5U, S5V, and S5K according to the second modification. The quantization coefficient QK is set at a value greater than "1" ("8" in the example in FIG. 11D), and the values of the quantization coefficients QY, QU, and QV are set all at "1".

<Third Modification>

In the above embodiment, the quantization coefficients QU and QV are set at the same value ("8" in the above example).

As a third modification, the quantization unit 24 allows the values of the quantization coefficients QU and QV to be set not at the same value, but at different values, in accordance with the extent of noise of U and V signals.

FIGS. 12A to 12D show the frequency data S5Y, S5U, S5V, and S5K according to the third modification. The value of the quantization coefficient QU is set at "8", and the value of the quantization coefficient QV is set at "4". In this example, noise of a U signal equivalent to the data of the lower 3 bits of the frequency data S4U is inhibited, and noise of a V signal corresponding to the data of the lower 2 bits of the frequency data S4V is inhibited.

<Fourth Modification>

Figures 13, 14:
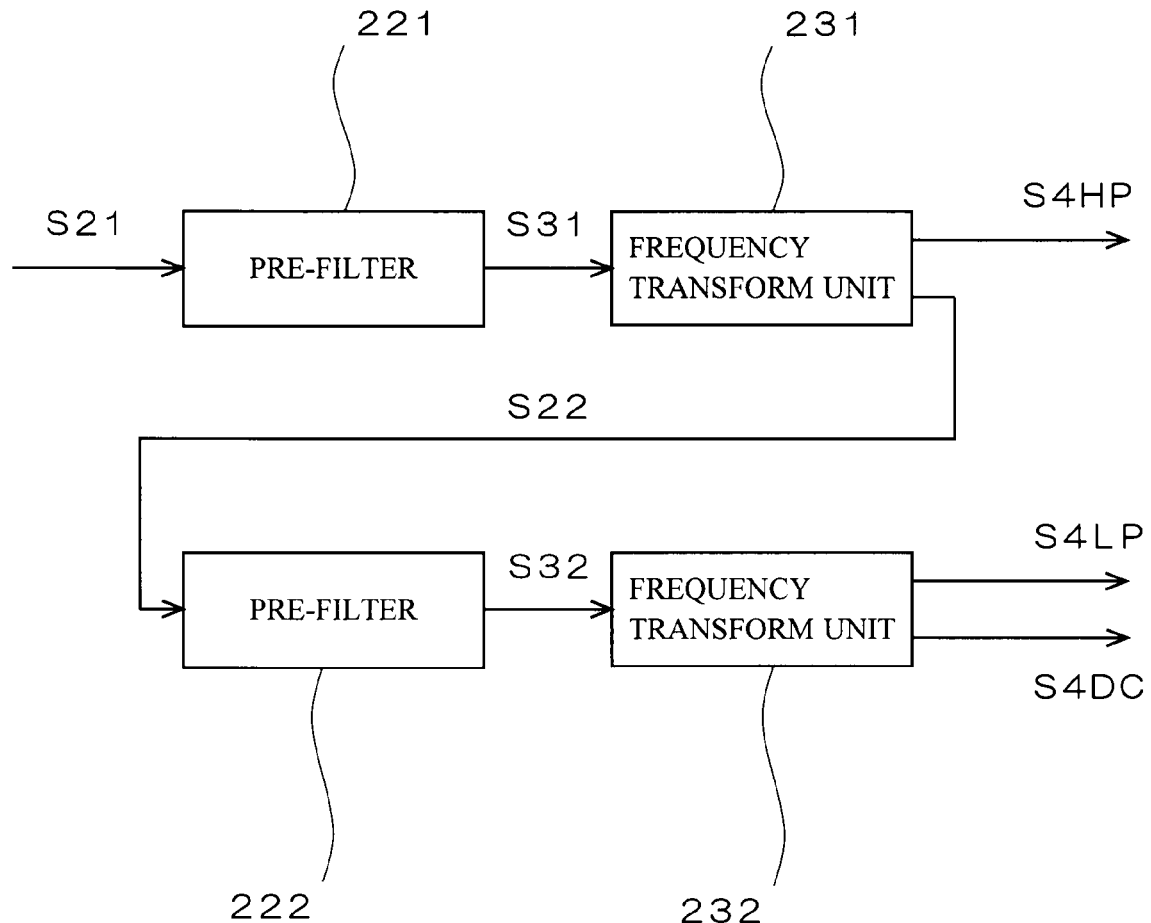
FIG. 13 is a block diagram showing a configuration of pre-filters and frequency transform units in an encoder for HD Photo.
FIG. 14 shows a data table for setting a quantization coefficient in a quantization unit.

FIG. 13 is a block diagram showing a configuration of pre-filters 221 and 222 and frequency transform units 231 and 232 in an encoder for HD Photo. As shown in FIG. 13, the encoder for HD Photo includes the pre-filter 221 and the frequency transform unit 231 of a first stage, and the pre-filter 222 and the frequency transform unit 232 of a second stage.

A pixel signal S21 is inputted to the pre-filter 221. The pre-filter 221 performs prefiltering on the pixel signal S21 and outputs a pixel signal S31 after prefiltering. The pixel signal S31 is inputted to the frequency transform unit 231. The frequency transform unit 231 performs frequency transform (PCT) on the pixel signal S31, and outputs frequency data S4HP of highpass component and data S22 of direct current component in the first stage. The data S22 is inputted to the pre-filter 222. The pre-filter 222 performs prefiltering on the data S22 and outputs data S32 after prefiltering. The data S32 is inputted to the frequency transform unit 232. The frequency transform unit 232 performs frequency transform (PCT) on the data S32, and outputs frequency data S4LP of lowpass component and frequency data S4DC of direct current component.

Thus according to HD Photo, the frequency data S4HP of highpass component is outputted from the frequency transform unit 231, and the frequency data S4LP of lowpass component and the frequency data S4DC of direct current component are outputted from the frequency transform unit 232. Accordingly, referring to FIG. 1, the frequency data S4 outputted from the frequency transform unit 23 includes the frequency data S4HP, S4LP, and S4DC respectively corresponding to the 3 frequency components, namely, highpass, lowpass, and direct current components. Referring further to FIG. 4, each of the frequency data S4Y, S4U, S4V, and S4K includes highpass, lowpass, and direct current components.

As a fourth modification, the quantization unit 24 allows each value of a total of 12 quantization coefficients to be set variably, in accordance with the extent of noise of each frequency component of each of the Y, U, V, and K signals.

FIG. 14 shows a data table for setting a quantization coefficient in the quantization unit 24. In the data table, a total of 12 quantization coefficients of each of Y, U, V, and K signals, and also of each of highpass (S4HP), lowpass (S4LP), and direct current (S4DC) components are described. The quantization unit 24 refers to this data table to determine the quantization coefficient employed for quantization of the frequency data S4.

In the example shown in FIG. 14, it is assumed that no noise occurs in any of the 3 frequency components with respect to Y and K signals, and that no noise occurs in direct current component, comparatively low noise occurs in lowpass component, and comparatively high noise occurs in highpass component with respect to U and V signals.

In such a case, as the example in FIG. 14 shows, the values of the quantization coefficients are set at "4" for lowpass component of each of the U and V signals, and set at "8" for highpass component of each of the U and V signals. The values of the other quantization coefficients are all set at "1".

<Fifth Modification>

When sufficient effect of inhibiting noise is not achieved by the above preferred embodiment, or when processing an image whose quality remarkably deteriorates with a quantization coefficient being set at a great value, the following processing may be performed to inhibit noise, in addition to the above preferred embodiment.

Figure 15:
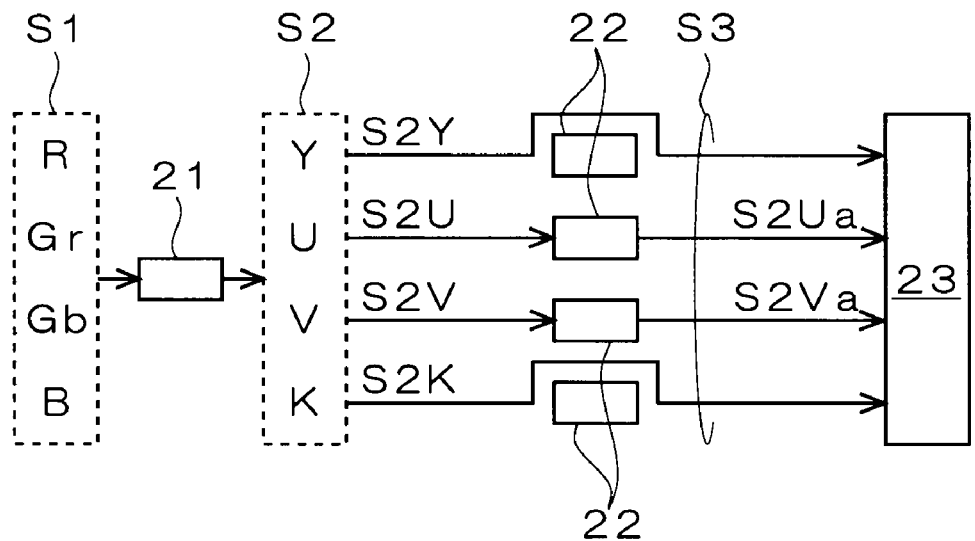
FIG. 15 illustrates processing in a pre-filter.

FIG. 15 illustrates processing in the pre-filter 22. As a result of the above color conversion by the color conversion unit 21, the pixel signal S2 includes pixel signals S2Y, S2U, S2V, and S2K respectively corresponding to Y, U, V, and K signals. The pre-filter 22 performs prefiltering on the pixel signals S2U and S2V, but not on the pixel signals S2Y and S2K. As a result of prefiltering on the pixel signals S2U and S2V, pixel signals S2Ua and S2Va are respectively obtained. Since a pre-filter is a kind of smoothing filter, by performing prefiltering on a signal, noise of the signal is inhibited, as in the above preferred embodiment.

The pixel signals S2Y, S2Ua, S2Va, and S2K are inputted to the frequency transform unit 23 as a pixel signal S3. In a fifth modification, it is assumed that noise occurs with respect to U and V signals, and no noise occurs with respect to Y and K signals, due to an attribute of an imaging element, as in the above preferred embodiment.

Figure 16:
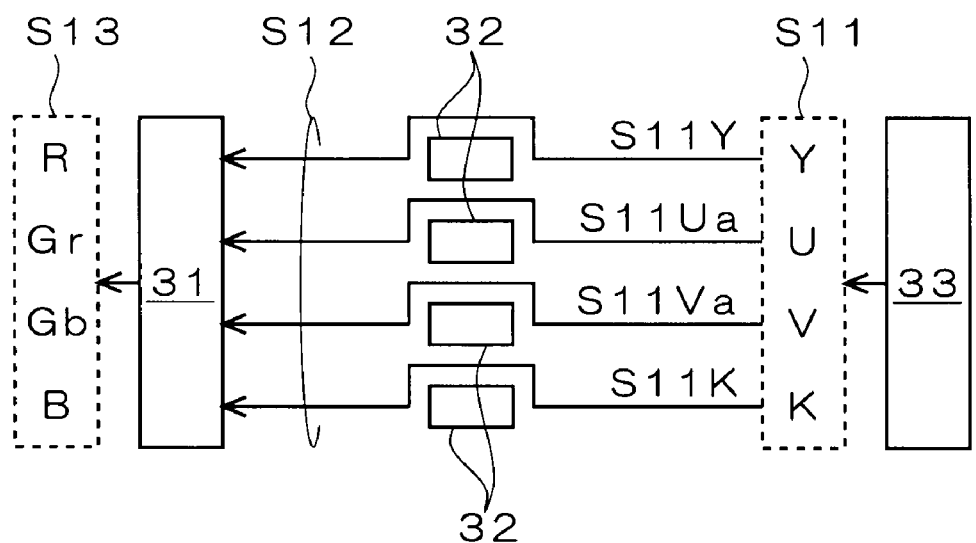
FIG. 16 illustrates processing in a post-filter.

FIG. 16 illustrates processing in the post-filter 32. The pixel signal S11 outputted from the frequency inverse transform unit 33 includes pixel signals S11Y, S11Ua, S11Va, and S11K respectively corresponding to Y, U, V, and K signals. As shown in FIG. 15, prefiltering by the pre-filter 22 has been performed on the U signal (pixel signal S2Ua) and the V signal (pixel signal S2Va). Thus smoothing effect by prefiltering has been reflected on the pixel signals S11Ua and S11Va equivalent to the pixel signals S2Ua and S2Va.

As shown in FIG. 16, the post-filter 32 does not perform postfiltering on any of the pixel signals S11Y, S11Ua, S11Va, and S11K. Consequently, the pixel signals S11Y, S11Ua, S11Va, and S11K are outputted as a pixel signal S12 from the post-filter 32 without being changed.

In the image processor 1 according to the fifth modification, the color conversion unit 21 converts the pixel signal S1 of RGB color space into the pixel signal S2 of YUVK color space including luminance and chrominance signals. Then as shown in FIG. 15, the pre-filter 22 performs prefiltering only on a specific signal (U and V signals in the above example) among a luminance signal and plural chrominance signals. Since a pre-filter is a kind of smoothing filter, by performing prefiltering on U and V signals, noise of the U and V signals is inhibited. Furthermore, since prefiltering is not performed on Y and K signals, processing to inhibit noise of the U and V signals does not affect the Y and K signals. That is, without affecting the Y and K signals with no noise, only noise of the U and V signals is effectively inhibited. Moreover, as shown in FIG. 16, the post-filter 32 does not perform postfiltering on any of the Y, U, V, and K signals. By not performing postfiltering on the U and V signals on which prefiltering has been performed, the effect of inhibiting noise of the U and V signals by prefiltering is maintained.

Furthermore, according to the fifth embodiment, the color conversion unit 21, the pre-filter 22, and the post-filter 32 which are primarily provided for HD Photo are used, in order to realize processing to inhibit noise of the U and V signals. Thus increase in cost is avoided, since no device dedicated merely to inhibition of noise of the U and V signals is required to be additionally implemented.

<First Modification of Fifth Modification>

The fifth modification describes processing to inhibit noise of U and V signals, assuming that noise occurs with respect to U and V signals, and that no noise occurs with respect to Y and K signals.

When noise occurs only with respect to a Y signal due to an attribute of an imaging element, noise of the Y signal is inhibited by performing prefiltering only on the Y signal and not performing prefiltering on the U, V, and K signals.

Figure 17:
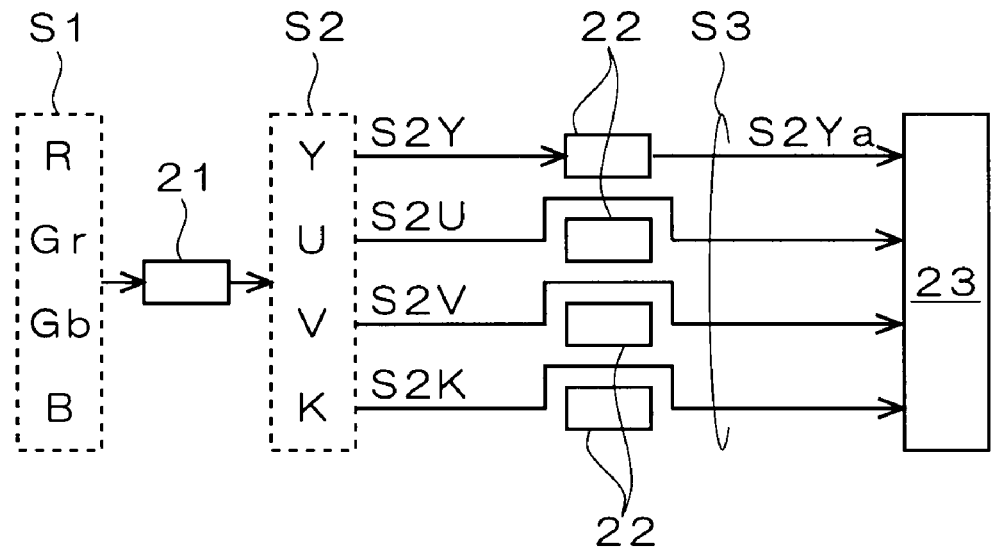
FIG. 17 illustrates processing in a pre-filter.

FIG. 17 illustrates processing in the pre-filter 22 according to a first modification of the fifth modification. As a result of the above color conversion by the color conversion unit 21, the pixel signal S2 includes pixel signals S2Y, S2U, S2V, and S2K respectively corresponding to Y, U, V, and K signals. The pre-filter 22 performs prefiltering on the pixel signal S2Y, but not on the pixel signals S2U, S2V, and S2K. As a result of prefiltering on the pixel signal S2Y, a pixel signal S2Ya is obtained. The pixel signals S2Ya, S2U, S2V, and S2K are inputted to the frequency transform unit 23 as a pixel signal S3.

Similar to the example shown in FIG. 16, the post-filter 32 does not perform postfiltering on any of the Y, U, V, and K signals. By not performing postfiltering on the Y signal on which prefiltering has been performed, the effect of inhibiting noise of the Y signal by prefiltering is maintained.

<Second Modification of Fifth Modification>

When noise occurs only with respect to a K signal due to an attribute of an imaging element, noise of the K signal is inhibited by performing prefiltering only on the K signal and not performing prefiltering on the Y, U, and V signals.

Figure 18:
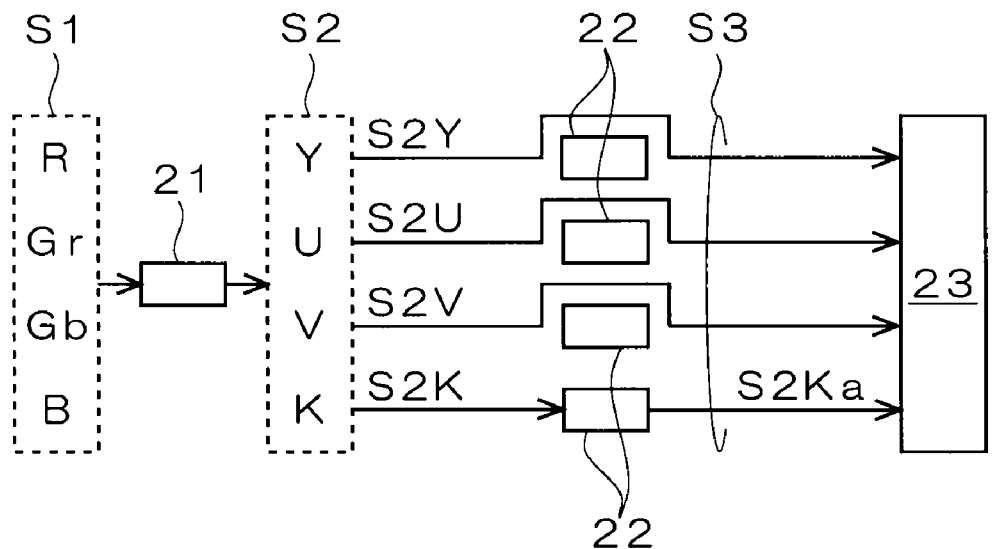
FIG. 18 illustrates processing in a pre-filter.

FIG. 18 illustrates processing in the pre-filter 22 according to a second modification of the fifth modification. As a result of the above color conversion by the color conversion unit 21, the pixel signal S2 includes pixel signals S2Y, S2U, S2V, and S2K respectively corresponding to Y, U, V, and K signals. The pre-filter 22 performs prefiltering on the pixel signal S2K, but not on the pixel signals S2Y, S2U, and S2V. As a result of prefiltering on the pixel signal S2K, a pixel signal S2Ka is obtained. The pixel signals S2Y, S2U, S2V, and S2Ka are inputted to the frequency transform unit 23 as a pixel signal S3.

Similar to the example shown in FIG. 16, the post-filter 32 does not perform postfiltering on any of the Y, U, V, and K signals. By not performing postfiltering on the K signal on which prefiltering has been performed, the effect of inhibiting noise of the K signal by prefiltering is maintained.

<Third Modification of Fifth Modification>

Referring to FIG. 13, in HD Photo, one can chose whether or not prefiltering should be performed by the pre-filter 221 of the first stage. When prefiltering by the pre-filter 221 is performed, one can further chose whether or not prefiltering should be performed by the pre-filter 222 of the second stage. That is, prefiltering can be performed twice maximum.

Figure 19:
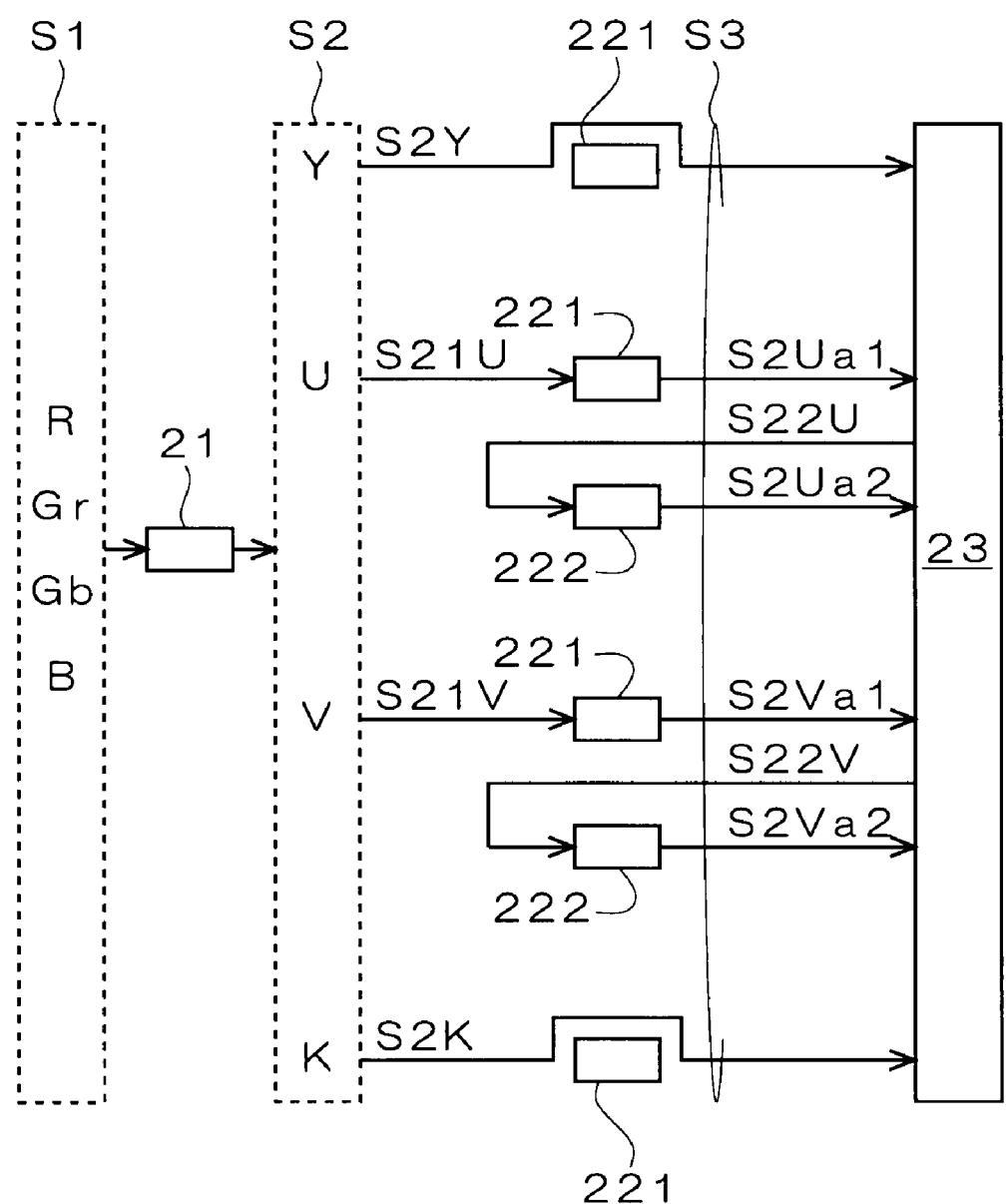
FIG. 19 illustrates processing in a pre-filter.

FIG. 19 illustrates processing in the pre-filter 22 according to a third modification of the fifth modification. As a result of the above color conversion by the color conversion unit 21, the pixel signal S2 includes pixel signals S2Y, S21U, S21V, and S2K respectively corresponding to Y, U, V, and K signals. The pre-filter 221 of the first stage performs prefiltering on the pixel signals S21U and S21V. As a result of prefiltering on the pixel signals S21U and S21V, pixel signals S2Ua1 and S2Va1 are respectively obtained. The frequency transform unit 23 performs frequency transform (PCT) independently on the pixel signals S2Ua1 and S2Va1, and outputs frequency data of highpass component (not shown) and data S22U and S22V of direct current component in the first stage respectively. The data S22U and S22V are inputted to the pre-filter 222 of the second stage. The pre-filter 222 performs prefiltering independently on the data S22U and S22V, and outputs data S2Ua2 and S2Va2 after prefiltering respectively. The data S2Ua2 and S2Va2 are inputted to the frequency transform unit 23. The frequency transform unit 23 performs frequency transform (PCT) independently on the data S2Ua2 and S2Va2, and outputs frequency data of lowpass component (not shown) and frequency data of direct current component (not shown). The third modification of the fifth modification assumes that high noise occurs with respect to U and V signals, and that no noise occurs with respect to Y and K signals.

In the third modification of the fifth modification, one can chose whether or not prefiltering should be performed by the pre-filter 221 of the first stage, in accordance with the specification of HD Photo. When prefiltering by the pre-filter 221 is performed, one can further chose whether or not prefiltering should be performed by the pre-filter 222 of the second stage. That is, prefiltering can be performed twice maximum. However, adding a pre-filter in a stage subsequent to the pre-filter 222 enables prefiltering to be performed more than twice.

According to the third modification of the fifth modification, noise of U and V signals is sufficiently inhibited, by setting the number of times prefiltering is performed at once or plural times, in accordance with the extent of noise of U and V signals.

The above describes an example of inhibiting noise of U and V signals sufficiently, by performing prefiltering twice on U and V signals. When prefiltering is performed twice on Y and K signals, noise of Y and K signals is also inhibited sufficiently.

<Fourth Modification of Fifth Modification>

The above fifth modification and the above first to third modifications of the fifth modification can be applied in appropriate combination in accordance with an attribute of an imaging element.

Figure 20:
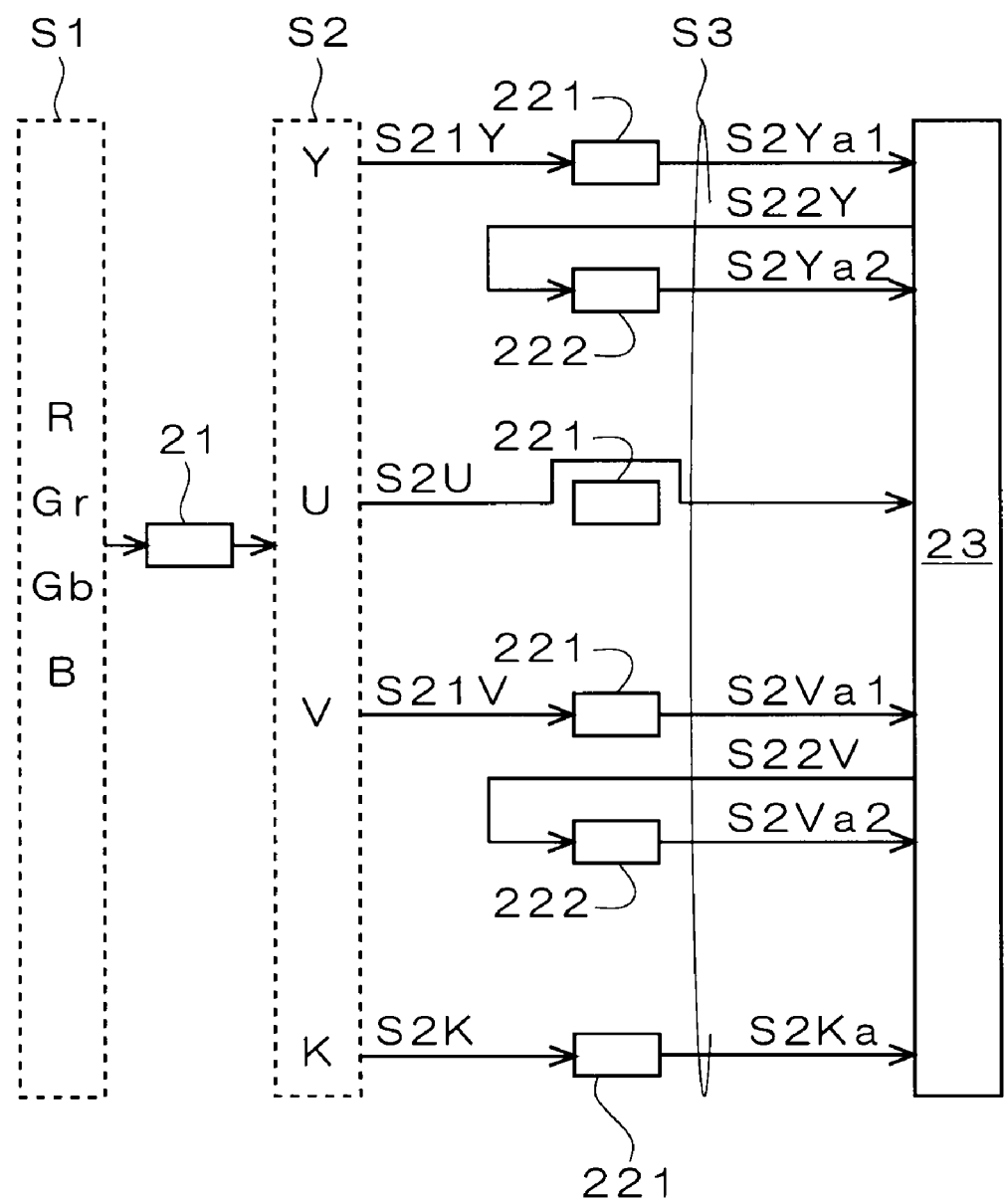
FIG. 20 illustrates processing in a pre-filter.

FIG. 20 illustrates processing in the pre-filter 22 according to a fourth modification of the fifth modification. The example shown in FIG. 20 assumes that comparatively high noise occurs with respect to Y and V signals, that comparatively low noise occurs with respect to a K signal, and that no noise occurs with respect to a U signal, due to an attribute of an imaging element. In this case, as shown in FIG. 20, prefiltering is performed twice on the Y and V signals, is performed once on the K signal, and is not performed on the U signal. Thereby, noise of the Y, V, and K signals is sufficiently inhibited, without affecting the U signal with no noise.

The above preferred embodiment, the above first to fifth modifications, and the above first to fourth modifications of the fifth modification can be applied in appropriate combination in accordance with an attribute of an imaging element.

While the invention has been described in detail, the foregoing description is in all aspects illustrative and not restrictive. It is understood that numerous other modifications and variations can be devised without departing from the scope of the invention.

What is claimed is:

1. An image processor comprising:
   a frequency transform unit configured to independently perform frequency transformation on a luminance signal and on plural chrominance signals and configured to output an item of frequency data for the luminance signal and a plurality of items of frequency data for the chrominance signals; and
   a quantization unit configured to independently perform quantization on an item of frequency data for the luminance signal and a plurality of items of frequency data for the chrominance signals input from the frequency transform unit, wherein
   the quantization unit performs quantization, with a quantization coefficient having a value greater than "1", on at least one particular item of frequency data, corresponding to a signal with noise, from among the item of frequency data for the luminance signal and the plurality of items of frequency data for the chrominance signals, and performs quantization, with a quantization coefficient having a value of "1", on any remaining frequency data apart from the at least one particular item of frequency data.

2. The image processor according to claim 1, wherein
   the quantization unit allows a value of a quantization coefficient to be set variably for the at least one particular item of frequency data, in accordance with the extent of noise.

3. The image processor according to claim 2, wherein
   the at least one particular item of frequency data includes highpass, lowpass, and direct current components, and
   the quantization unit allows values of quantization coefficients to be set variably for each component, in accordance with an extent of noise.

4. The image processor according to claim 3, further comprising:
   a pre-filter configured to selectively perform prefiltering with a region which overlaps with plural unit regions for processing by the frequency transform unit as a unit region for processing, before frequency transform is performed;
   a color conversion unit being arranged in a stage preceding the pre-filter and configured to convert a pixel signal of a first color space inputted from outside into a pixel signal of a second color space including the luminance signal and the plural chrominance signals;
   a frequency inverse transform unit configured to perform frequency inverse transformation;
   a post-filter configured to selectively perform postfiltering with a region which overlaps with plural unit regions for processing by the frequency inverse transform unit as a unit region for processing, after frequency inverse transform is performed; and
   a color inverse conversion unit being arranged in a stage subsequent to the post-filter and configured to inversely convert a pixel signal of the second color space into a pixel signal of the first color space, wherein
   the pre-filter performs prefiltering on one or plural specific signals corresponding to a signal with noise among the luminance signal and the chrominance signals inputted from the color conversion unit, and
   the post-filter does not perform postfiltering on the specific signals.

5. The image processor according to claim 4, wherein
   the number of times that prefiltering is performed on the specific signals is set at once or plural times.

6. The image processor according to claim 2, further comprising:
   a pre-filter configured to selectively perform prefiltering with a region which overlaps with plural unit regions for processing by the frequency transform unit as a unit region for processing, before frequency transform is performed;
   a color conversion unit being arranged in a stage preceding the pre-filter and configured to convert a pixel signal of a first color space inputted from outside into a pixel signal of a second color space including the luminance signal and the plural chrominance signals;
   a frequency inverse transform unit configured to perform frequency inverse transformation;
   a post-filter configured to selectively perform postfiltering with a region which overlaps with plural unit regions for processing by the frequency inverse transform unit as a unit region for processing, after frequency inverse transform is performed; and
   a color inverse conversion unit being arranged in a stage subsequent to the post-filter and configured to inversely convert a pixel signal of the second color space into a pixel signal of the first color space, wherein the pre-filter performs prefiltering on one or plural specific signals corresponding to a signal with noise among the luminance signal and the chrominance signals inputted from the color conversion unit, and the post-filter does not perform postfiltering on the specific signals.

7. The image processor according to claim 6, wherein the number of times that prefiltering is performed on the specific signals is set at once or plural times.

8. The image processor according to claim 1, further comprising:

a pre-filter configured to selectively perform prefiltering with a region which overlaps with plural unit regions for processing by the frequency transform unit as a unit region for processing, before frequency transform is performed;

a color conversion unit being arranged in a stage preceding the pre-filter and configured to convert a pixel signal of a first color space inputted from outside into a pixel signal of a second color space including the luminance signal and the plural chrominance signals;

a frequency inverse transform unit configured to perform frequency inverse transformation;

a post-filter configured to selectively perform postfiltering with a region which overlaps with plural unit regions for processing by the frequency inverse transform unit as a unit region for processing, after frequency inverse transform is performed; and a color inverse conversion unit being arranged in a stage subsequent to the post-filter and configured to inversely convert a pixel signal of the second color space into a pixel signal of the first color space, wherein the pre-filter performs prefiltering on one or plural specific signals corresponding to a signal with noise among the luminance signal and the chrominance signals inputted from the color conversion unit, and the post-filter does not perform postfiltering on the specific signals.

9. The image processor according to claim 8, wherein the number of times that prefiltering is performed on the specific signals is set at once or plural times.

* * * * *